L. D. LOVEKIN.
THERMOSTATIC GAS VALVE MECHANISM.
APPLICATION FILED JULY 15, 1912.
1,221,197.
Patented Apr. 3, 1917.
2 SHEETS—SHEET 1.
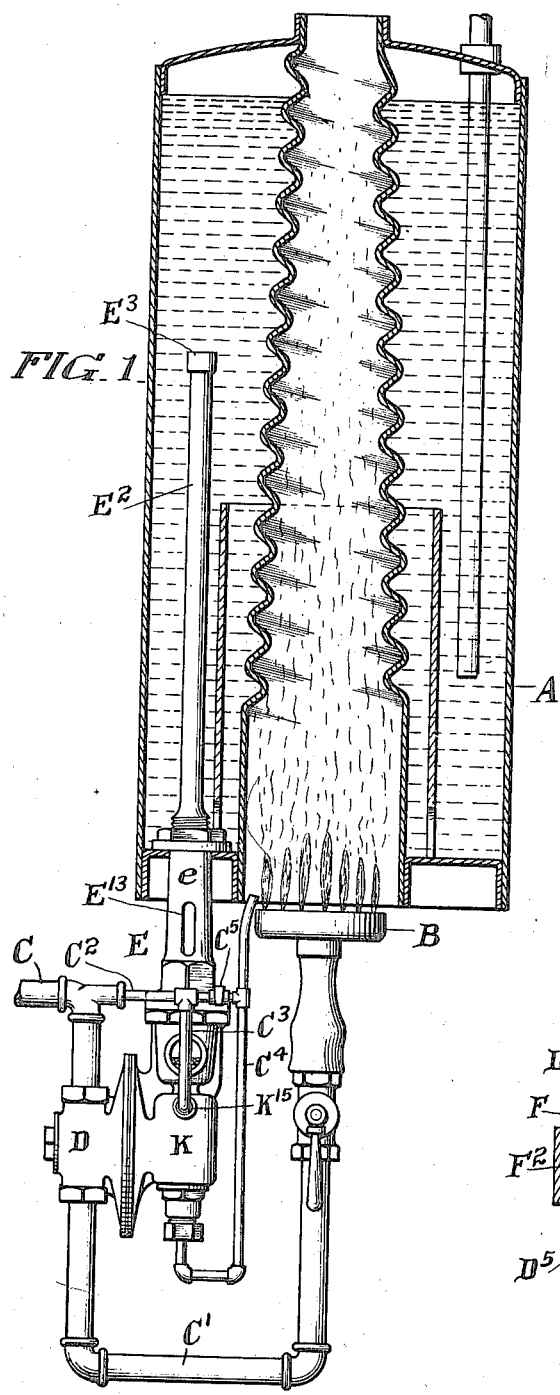
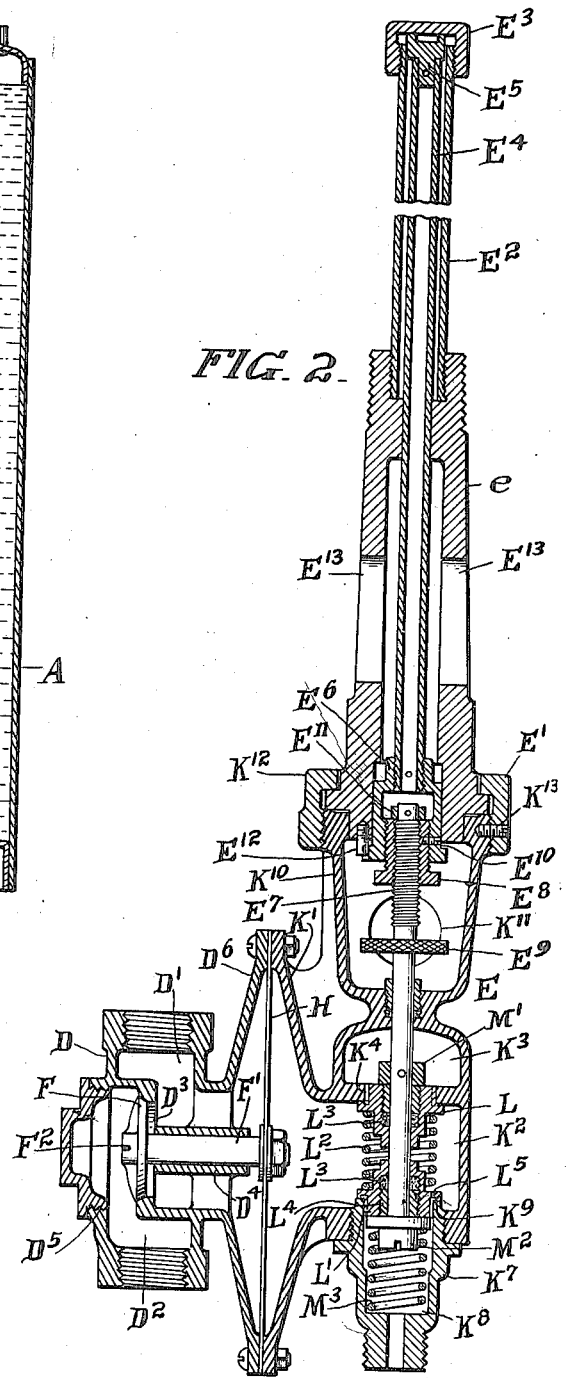

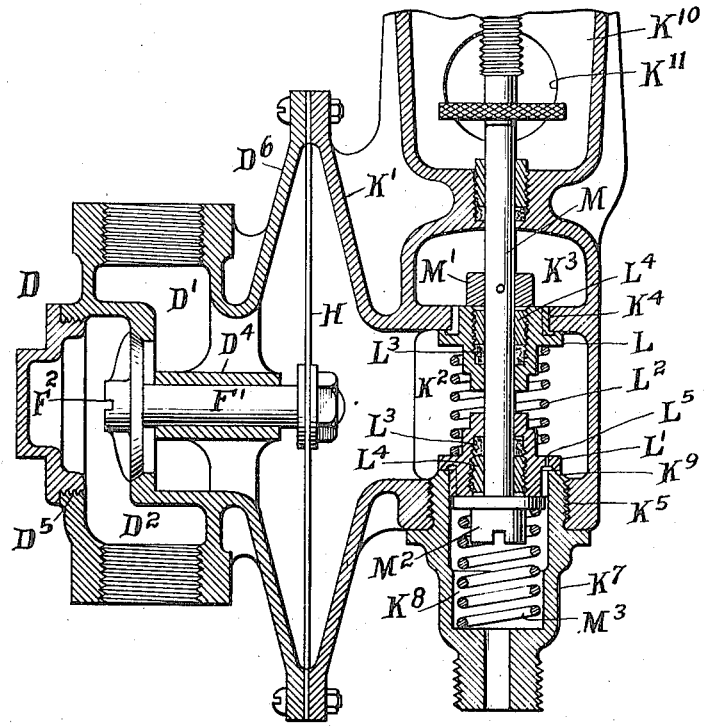
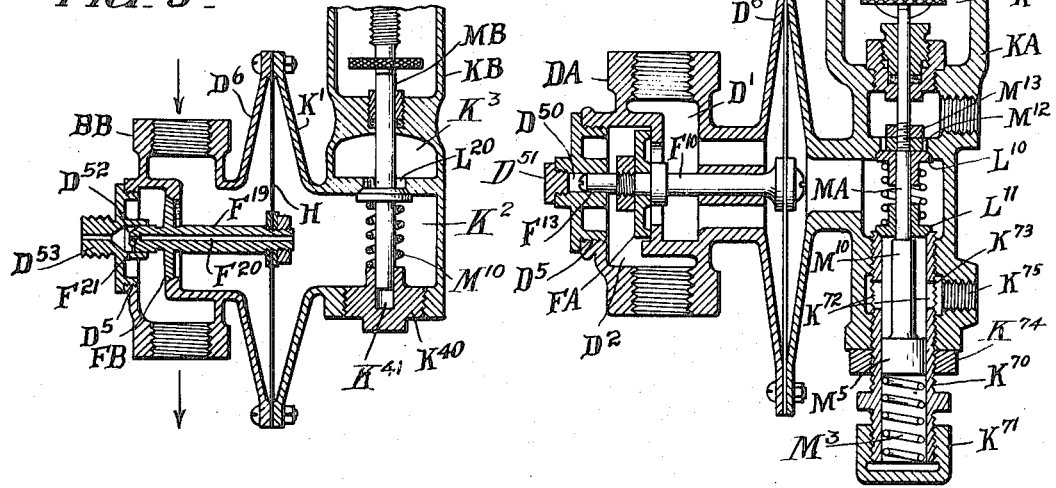

UNITED STATES PATENT OFFICE.

LUTHER D. LOVEKIN, OF PHILADELPHIA, PENNSYLVANIA.

THERMOSTATIC GAS-VALVE MECHANISM.

1,221,197.   Specification of Letters Patent.   Patented Apr. 3, 1917.

Application filed July 15, 1912. Serial No. 709,355.

*To all whom it may concern:*

Be it known that I, LUTHER D. LOVEKIN, a citizen of the United States of America, residing in the city and county of Philadelphia, in the State of Pennsylvania, have invented a certain new and useful Improvement in Thermostatic Gas-Valve Mechanisms, of which the following is a true and exact description, reference being had to the accompanying drawings, which form a part thereof.

My present invention relates to a thermostatic gas valve mechanism, especially adapted to automatically control the flow of gas to the burner of a water heater to maintain the temperature of the water therein at or above a certain pre-determined minimum. The general object of the invention is to provide a simple, effective and reliable mechanism for the purpose specified. More specifically, one main object of the invention is to provide a thermostatically controlled mechanism utilizing the pressure of the gas supply system to operate a main gas valve, which will insure positive and substantial opening and closing movements of said valve. This I accomplish by the use of a pilot valve, directly controlled by the thermostatic mechanism, and actuated thereby to establish communication between the gas supply system and the pressure chamber of fluid pressure operating means for the main gas valve to open the latter and to cut off such communication when the main gas valve should close. The closing of the main gas valve is brought about after communication between the supply system and pressure chamber is interrupted by reducing the pressure in said chamber. This reduction in pressure may be effected either by the use of a continuously open restricted leakage channel, or channels, leading from said chamber or by the use of an exhaust port controlled by the pilot valve mechanism, or, advantageously, the provisions for obtaining a restricted leakage from the chamber may be combined with the pilot valve controlled exhaust port in such manner that the closing movements of the main gas valve are normally brought about by the reduction in pressure resulting from the restricted leakage out of the chamber, but in case the leakage discharge channel or channels become clogged, the thermostatically controlled exhaust port will open and bring about the closing movement of the main valve. Advantageously, the gas exhausted from the pressure chamber is disposed of and utilized by passing it to the pilot burner which is constantly kept alight in the normal operation of the apparatus.

A further specific object of the invention is to provide mechanism of the character specified, which is simple in construction and comparatively cheap to manufacture, and which is easy to assemble, take apart and adjust.

The various features of novelty which characterize my invention are pointed out with particularity in the claims annexed to and forming a part of this specification. For a better understanding of the invention, however, and of the advantages possessed by it, reference should be made to the accompanying drawings and descriptive matter in which I have illustrated forms in which the invention may be embodied.

Of the drawings,

Figure 1 is an elevation partly in section showing a water heater and mechanism for controlling the flow of the fuel burned to heat the water therein.

Fig. 2 is a sectional elevation of the fuel-controlled mechanism proper shown in Fig. 1.

Fig. 3 is a view taken similarly to Fig. 2 but on a larger scale and showing a portion only of the apparatus shown by Fig. 2.

Fig. 4 is a sectional elevation of a modified form of the apparatus shown in Fig. 2.

Fig. 5 is a sectional elevation of a second modification of the apparatus shown in Fig. 2.

In the drawings, and referring first to the construction shown in Figs. 1, 2 and 3, A represents a water heater, B the main gas burner for the heater, and C the main gas supply pipe. A pipe $C^1$ connects the burner B to the main gas valve D, and the latter is connected in turn to the supply pipe C. The valve D is controlled, as hereinafter explained in detail, by a thermostatic mechanism E, secured to the bottom of the heater, and comprising a portion extending into the heater, and comprising also a pilot valve K, operated by the thermostatic mechanism. The casing of the main gas valve D is formed with an inlet chamber $D^1$ and an outlet chamber $D^2$. These chambers are connected to the pipes C and $C^1$, respectively, and are connected together by a port $D^3$ which is controlled by the conical valve member F, located on the outlet side of port $D^3$. The stem $F^k$ of the valve member F has a sliding bearing in the sleeve $D^4$, carried by the valve casing D on the inlet side of, and co-axial with the port $D^3$. The valve member F is formed at its outer end with a kerf $F^2$ by means of which the valve stem may be held against rotation in the assembly and adjustment of the apparatus, and an aperture $D^5$, normally closed by a removable plug is formed in the casing of valve D to permit the insertion of the valve member F into and its removal from the valve casing when this is necessary. Advantageously, the valve member F and its stem $F^1$ are made of aluminum which permits the movable valve parts to be of very light weight.

At its inner end the valve stem $F^1$ is detachably secured to the center of a flexible diaphragm H which is of circular form and is clamped at its periphery between the edges of conical shell-like portions $D^6$ and $K^1$ respectively, of the casings of the gas valve D and the pilot valve K. One side of the diaphragm H is thus exposed to the pressure of the gas in the inlet chamber $D^1$ of the valve D, and the other side of the diaphragm is exposed to the pressure existing in the pressure chamber $K^2$ of the valve K. The casing of valve K has an inlet chamber $K^3$ communicating with the pressure chamber $K^2$, through the port $K^4$. A threaded aperture, $K^5$, is formed in the wall of the casing K, at the opposite side of the chamber $K^2$ from the port $K^4$, and in axial alinement with the latter. This aperture receives the externally threaded tubular member $K^7$. The latter is formed with a spring chamber $K^8$ open at its upper end, and with a valve seat $K^9$ at the upper end of said spring chamber, and with a passage leading from the lower end of the spring chamber and connected by the pipe $C^4$, the free end of which serves as a pilot burner. The chamber $K^3$ of the valve casing K is connected to the main gas supply pipe C by the pipe $C^2$ and branch pipe $C^3$. The pipe $C^2$ is also connected to the pilot burner through the cock $C^5$. Communication between the supply chamber $K^3$ and the intermediate chamber $K^2$ and between the latter and the spring chamber $K^8$ is controlled by valve members L and $L^1$, respectively. These are located within the chamber $K^2$ and are slidably mounted on the valve rod M between the shoulders on the latter formed by the collar $M^1$ pinned to the rod M, and by the nut $M^2$ threaded on the lower end of the rod M. The valves L and $L^1$ are at all times urged away from each other and into the position in which they close the ports $K^4$ and the mouth of the spring chamber $K^8$ by an interposed spring $L^2$. It will be apparent, however, that when the valve rod is depressed collar $M^1$ will engage the valve L and move it away from its seat, and that in this condition at the aperture the valve $L^1$ will be seated. Similarly, when the valve rod is elevated, the nut $M^2$ will engage the valve $L^1$, and lift it away from its seat, and at the same time the valve L will be held against its seat by the spring $L^2$. In practice, I prefer to adjust the parts so that, as shown in Fig. 2, the valves L and $L^1$ may both be seated at the same time, and a slight axial movement of the valve rod M away from a neutral position is required to open either valve. In the practical use of my invention, I have found it highly desirable, if not absolutely essential, to make stuffing box provisions such as are formed by the packing $L^3$, and the screw gland $L^4$, to prevent leakage through the valve member L, along the rod M. I also consider it advantageous to employ similar stuffing box provisions in connection with the valve $L^1$, although I prefer to provide for a restricted leakage out of the chamber $K^2$, such as may advantageously be obtained by forming a small hole $L^5$ through the valve member $L^1$.

As shown, a spring $M^3$ constantly acts on the valve rod M in the direction tending to lift the valve member L off its seat. This spring is located in the spring chamber $K^8$, and extends between the bottom of that chamber and the nut $M^2$ threaded on the lower end of the rod M. The spring $M^3$ should be under tension sufficient to overcome the tension of the spring $L^2$ when occasion permits.

The casing K is formed above the chamber $K^3$, with a tubular portion $K^{10}$ cut away to provide finger holes $K^{11}$, and terminating at its upper end, in a machined end surface against which a shoulder $E^1$ of a tubular body member $e$ is clamped by the apertured cap member $K^{12}$ screwed to the externally threaded upper end of the casing K and normally locked against displacement by the locking screw $K^{13}$. This arrangement permits the casing K to be adjusted angularly with respect to the body member $e$ in assembling the apparatus and taking it apart without disturbing the adjustment of the thermostatic mechanism proper. The member $e$ is threaded at its upper end into the lower end wall of the heater and has a tubular member $E^2$ threaded into its upper end. The member $E^2$ extends into the interior of the heater and is closed at its upper end by the cap member $E^3$.

The valve actuating member proper comprises a tubular part $E^4$, located within the tubular member $E^2$ and provided at its upper end with a piece $E^5$ adapted to engage the cap $E^3$, and, at its lower end, with an end member $E^6$, having a sliding fit in the member $e$. A bolt $E^7$ threaded into a nut $E^8$, which is externally threaded and is screwed into a threaded socket formed in the end member $E^6$ forms an adjustable extension of the tubular part $E^4$, and is adapted to engage the valve rod M. The bolt $E^7$ has a knurled head $E^9$ in position to be engaged through the finger holes $K^{11}$. An approximate initial adjustment of the length of the valve actuating member is had by rotating the nut $E^8$ in its threaded socket after which the nut and end member $E^6$ are locked together by the set screw $E^{10}$. A further adjustment may then be had by rotating the bolt $E^7$ in the nut $E^8$. To prevent an undue elongation of the valve actuating member after the nut $E^8$ is locked to the end member $E^6$, the bolt $E^7$ has a collar $E^{11}$ pinned to its upper end.

A pin $E^{12}$ secured in the lower end of the body member $e$ operates in conjunction with a guide surface formed on the end member $E^6$, to prevent relative rotation between the end member $E^6$ and body member $e$ which, if permitted, interferes with the ready adjustment of the apparatus. Passages $E^{13}$ are formed in the body member to permit of a circulation of air through the space surrounding the member $E^4$, which tends to cool the latter, therefore adding to the sensitiveness of the thermostatic actuating mechanism. The tubular member $E^4$ may preferably be made of steel which has a relatively small coefficient of thermal expansion, while the tube $E^2$ is made of brass, copper or other material having a relatively high coefficient of thermal expansion.

In the arrangement shown in Figs. 1 and 2 gas is supplied to the chamber $K^3$ of the pilot valve mechanism from the supply pipping C through the pipe $C^2$ and the branch pipe $C^3$, which is secured in a suitable aperture $K^{15}$, opening from the chamber $K^3$. The waste gas from the pilot valve mechanism is carried away by the pipe $C^4$ coupled to the member $K^7$ and opening to the interior of the latter through the aperture in its lower end. Advantageously, as shown, the pipe $C^4$ terminates at its free end in proximity to the main gas burner B, and, in practice, I prefer as shown that the upper end of the pipe $C^4$ shall serve as the pilot burner by which a pilot flame for igniting the gas issuing from the main burner is constantly kept alive. For this purpose, I have connected the pipe $C^4$ to the pipe $C^2$ through a suitable regulating valve $C^5$, as shown in Fig. 1, which permits of a constant restricted flow of gas to the burner end of the pipe $C^4$. It will be understood that the arrangement should be such that the restricted flow of gas into pipe C permitted by the valve $C^5$, is not great enough to create a pressure in the pipe $C^4$ appreciably higher than the pressure of the atmosphere.

In operation, the expansion of the tubular part $E^2$ relative to the tubular member $E^4$, occurring when the water in the heater reaches a certain temperature fixed by the adjustment of the apparatus, permits the pilot rod M to be moved by the spring $M^3$ into the position in which the valve L closes the port $K^4$, so that gas cannot then pass into the pressure chamber $K^3$. As soon as communication is thus cut off between the supply chamber $K^3$ and the pressure chamber $K^2$ of the valve K, the pressure in the chamber $K^2$ quickly falls to the pressure of the atmosphere owing to the leakage constantly taking place through the restricted leakage port $L^5$. When the pressure in chamber $K^2$ is thus reduced, the valve F is closed and held closed by the pressure of the gas supply system. This pressure, while acting directly against the valve F in a direction tending to open the latter, acts in the opposite direction against the substantially larger area of the left-hand side of the diaphragm H, as seen in Fig. 2.

When the temperature of the water in the tank A falls below that which the apparatus is adjusted to maintain, the resultant contraction of the tube $E^2$ causes the valve rod M to be moved downward, and thereby open the valve L. This permits gas from the supply system to flow from the supply chamber $K^3$ of the pilot valve mechanism into pressure chamber $K^2$, thereby raising the pressure in the latter to that of the main gas supply system. This equalizes the pressure on the two sides of the diaphragm H and the gas pressure acting directly against the inlet side of the valve F causes the latter to begin to open. As the valve F begins to open, the pressure on the outlet side of the valve rises and the pressure on the inlet side may fall. This diminishes the pressure differential acting directly on the valve F but is more than compensated for, and a rapid and complete opening movement of the valve is insured by the consequent decrease in the pressure acting against the left-hand side of the diaphragm H. When the valve F thus opens, gas is supplied to the burner B through the pipe $C^1$. The gas issuing from the burner B is instantly ignited by the flame from the pilot burner and the flame from the main burner continues until the water in the tank is again raised to the desired temperature, whereupon the resultant expansion of the thermostatic member $E^2$ again permits the valve rod to be moved by the spring $M^3$ into the position shown in Fig. 2 in which the valves L and $L^1$ are both seated.

With the apparatus shown in Fig. 2, gas is constantly leaking from the chamber $K^2$ through the port $L^5$, while the main gas valve is open. This gas is not wasted, however, since it is burned at the pilot burner and the heat resulting from its combustion is added to the heat then given off at the main burner in heating the water in the tank A. As a matter of fact, however, the amount of gas leaking through the port $L^5$ in the normal operation of the apparatus, is so small that its heating effect is practically negligible, for the port $L^5$ may well have a very small diameter. For instance, I have obtained excellent results with apparatus in which this port is about 1/1000 of an inch in diameter. Should the port $L^5$ become clogged, as may occur from time to time, the only result is to slightly delay the time at which the main gas valve will close, and to make its closing movement a trifle more sluggish. When the leakage port $L^5$ becomes clogged, it will be apparent that the mere closure of the port $K^4$ will not result in closing the main gas valve, but a slight expansion of the tube $E^6$ beyond that required to permit the seating of the valve L will result in permitting an upward movement of the valve rod M under the action of its spring $M^3$ sufficient to lift the valve $L^1$ off its seat, and thereby connect the chamber $K^2$ freely with the pipe $C^4$ running to the pilot burner.

While I consider it desirable, in most cases, to provide a constantly open restricted leakage passage from the pressure chamber $K^2$, since with it no increase in the temperature of the water heated beyond that required for the seating of the valve L is necessary to bring about the closure of the main gas valve, the temporary closure or permanent omission of this port does not destroy the material effectiveness of the apparatus.

In Fig. 4, I have shown a modification of the apparatus of Figs. 1, 2 and 3, in which certain changes in construction and arrangement are made. In particular, the constantly open leakage channel from the pressure chamber $K^2$ is dispensed with, though such a channel may well be used in this construction also. The main gas valve DA and the pilot valve mechanism KA of Figs. 3 and 4 correspond in most respects to the valve mechanism D and K of the form first described, and similar parts in the two constructions are designated in the drawings by similar reference letters.

In the construction shown in Fig. 4, the removable part $K^7$ of Fig. 2 is replaced by an externally threaded tubular fitting $K^{70}$ having its open upper end adapted to form a seat for the lower pilot valve member, $L^{11}$, and having its lower end closed by a cap $K^{71}$. The member $K^{70}$ is formed with ports $K^{72}$ connecting its interior with an outlet annular channel $K^{73}$ formed in the casing of valve KA. The fitting $K^{70}$ is in threaded engagement with the casing of valve KA both above and below the channel $K^{73}$, and is adapted to be axially adjusted to the different operative positions. $K^{74}$ represents a lock nut for securing the member $K^{70}$ in any desired adjustment. $K^{75}$ represents a threaded socket opening from the channel $K^{73}$ and into which the pipe $C^4$ may be secured. As shown in Fig. 4, the main gas valve member FA controlling the port $D^3$ is in the form of a disk, separable from but normally clamped to the valve stem $F^{10}$ and the latter is formed with an extended outer end $F^{13}$, having a sliding bearing in the passage $D^{50}$ formed in the plug, closing the aperture $D^5$ in the casing of valve DA. The outer end of the passage $D^{50}$ is normally closed by the small plug $D^{51}$.

The upper and lower pilot valve members $L^{10}$ and $L^{11}$ may be identical with the valves L and $L^1$ first described, but, as shown, do not have stuffing box provision. As shown, the valve rod MA is formed at its lower end with an integral enlargement $M^{10}$, forming a collar adapted to engage the under side of the valve $L^{11}$. Above the valve $L^{10}$ the rod MA is formed with a reduced threaded portion to receive a collar for engaging the upper side of the valve member $L^{10}$. This collar is formed by the nut $M^{12}$ and the lock nut $M^{13}$. At its lower end the rod MA is further enlarged to provide a piston-like guide $M^5$. The spring $M^3$ extends between the guide $M^5$ and the cap $K^{71}$. The operation of the apparatus shown in Fig. 4 will be readily apparent without further explanation from what has already been said.

In the modification shown in Fig. 5, the casings of the main valve BB and of the pilot valve mechanism KB do not differ from the corresponding parts of the mechanism shown in Fig. 2. In Fig. 5 communication between the supply chamber $K^3$ and the pressure chamber $K^2$ of the pilot valve mechanism, is controlled by a valve member $L^{20}$ which may be integrally connected to the valve rod MB, and the aperture at the bottom of the chamber $K^2$ closed in Fig. 2 by the member $K^7$, is closed by a plug $K^{40}$ formed with a guide socket $K^{41}$ for the lower end of the valve rod MB. The valve member $L^{20}$ is constantly urged toward its seat by the spring $M^{10}$ interposed between it and the plug $K^{40}$. With the construction shown in Fig. 5, the necessary reduction in pressure in the chamber $K^2$ following the seating of the valve $L^{20}$ is brought about by the leakage through the leakage channel $F^{20}$ and $F^{21}$, formed in the valve stem $F^{19}$ of the main gas valve FB. As shown, the portion $F^{20}$ of this leakage channel is relatively large in diameter, while the short portion $F^{21}$ is restricted and may be of substantially the same diameter as the port $L^5$ of the construction first described. The outer end of the valve stem $F^{19}$ has a sliding bearing in the passage $D^{52}$ formed in the plug closing the valve casing aperture $D^5$, and this plug is provided with an external hollow boss $D^{53}$ connecting with the passage $D^{22}$ and externally threaded for connection to the pipe $C^4$ running to the pilot burner.

It will be apparent that the apparatus shown in Fig. 5 while simpler than that shown in Fig. 2, will operate in exactly the same manner, so long as the leakage port $L^5$ of the apparatus shown in Fig. 2 is effective to bring about the reduction in pressure in chamber $K^2$ necessary for the closure of the main gas valve. The apparatus shown in Fig. 5 is open to the objection, however, that it is rendered ineffective to close the main gas valve, by the clogging up of the restricted leakage channel while, as before explained, such clogging makes but a slight change in the operation of the apparatus shown in Fig. 2.

While in general, the various forms of apparatus disclosed can be used with any of the parts horizontal or vertical, or inclined to be horizontal as desired, I usually prefer that the line of action of the main gas valve shall be horizontal and independent of action of gravity, and I prefer that the main gas valve and its valve stem shall be made of aluminum to decrease the weight of the moving parts. The horizontal arrangement of the main gas valve is of particular importance in the form of the apparatus shown in Fig. 5, because with this disposition of parts the liability of the restricted leakage channel to clog is greatly diminished. I have demonstrated by extended practical use of the apparatus disclosed herein, that positive and rapid opening and closing movements of the main gas valve may readily be obtained, notwithstanding the comparatively small difference between the pressure of the atmosphere and the pressure of the gas supply system. It will be obvious to those skilled in the art that the apparatus disclosed is compact and comparatively easy and inexpensive to manufacture, and that the various parts may be assembled, taken apart, adjusted and repaired with ease. With the particular provisions for adjustment disclosed an approximate adjustment of the length of the thermostatic valve actuating member formed by the ports $E^4$, $E^8$ and $E^7$ may be obtained when the apparatus is originally installed, and after being so installed, a further adjustment within comparatively narrow limits can readily be had by rotation of the bolt $E^7$, the knurled head of which is accessible for this purpose, through the single opening $K^{11}$. With this arrangement, the initial adjustment should be so effected that the further adjustment obtained by the rotation of the bolt $E^7$ cannot result in the production of excessive temperatures within the heater A. As both the collar $E^{11}$ and the locking screw $E^{10}$ by which the nut $E^8$ is screwed to the end $E^6$ are inaccessible in the assembled apparatus, the ordinary unskilled attendant, while readily able to adjust the apparatus to vary the temperature of the water heated within the range of adjustment obtainable by rotating bolt $E^7$, is prevented from adjusting the apparatus in such manner as to obtain a dangerous or objectionably high temperature in the heater.

While in accordance with the provisions of the statutes, I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent is:

1. In combination a main gas burner, a gas supply system, a main valve controlling the flow of gas from said system to said burner, and operating provisions for said main valve including a pressure chamber, a waste gas conduit leading from said chamber and a thermostatically actuated valve mechanism adapted to connect said chamber alternately to said gas supply system and to said waste pipe.

2. In combination a main gas burner, a gas supply system, a main valve controlling the flow of gas therefrom to said burner, and operating provisions for said main valve including a pressure chamber, a normally open restricted leakage vent leading from said pressure chamber, a second gas escape vent leading from said pressure chamber, and a thermostatically actuated valve mechanism adapted to cut off and establish communication between said pressure chamber and said system as the temperature to which said thermostatic mechanism is subjected approaches and recedes from one limit and adapted to open said second vent when said temperature receding from said limit reaches a second predetermined limit.

3. A thermostatic valve mechanism for controlling the supply of gas from a gas supply system to a gas burner comprising in combination, a main gas valve having inlet and outlet chambers and a port connecting them, and a valve member controlling said port and located on the outlet side thereof, a pilot valve mechanism comprising a pressure chamber, a restricted continuously open leakage channel leading therefrom, and thermostatically actuated means adapted to control communication between said pressure chamber and said gas supply system, and a flexible diaphragm separating said pressure chamber from said inlet chamber and connected to and operating said valve member.

4. A thermostatic valve mechanism for controlling the supply of gas from a gas supply system to a gas burner comprising in combination, a main gas valve having inlet and outlet chambers and a port connecting them, a valve member controlling said port and located on the outlet side thereof, a pilot valve mechanism comprising a pressure chamber and thermostatically actuated means adapted to alternately connect said pressure chamber to said gas supply system and to waste on predetermined variations in the temperature to which said thermostatically actuated means is exposed, and a flexible diaphragm separating said pressure chamber from the first mentioned inlet chamber and connected to and operating said valve member.

5. A thermostatic valve mechanism controlling the supply of gas from a gas supply system to a gas burner comprising in combination, a main gas valve having inlet and outlet chambers and a port connecting them, a valve member controlling said port and located on the outlet side of the outlet thereof, a pilot valve mechanism comprising a pressure chamber, a normally open restricted leakage vent opening therefrom, a second gas escape vent opening from said pressure chamber, and thermostatically actuated means adapted to cut off and establish communication between said pressure chamber and said gas supply system as the temperature to which said thermostatic mechanism is exposed approaches and recedes from one limit and adapted to open said second vent when said temperature receding from said limit reaches a second pre-determined limit.

6. In combination a main valve and fluid pressure operating means therefor including a chamber and inlet and outlet passages through which a fluid under pressure is admitted to and exhausted from said chamber to thereby open and close said valve and a thermostatically actuated valve mechanism comprising separate valve members controlling said passages, resilient means tending to separate said valve members and cause them to seat, and a valve operating member on which said valves are slidingly mounted, said operating member having provisions adapted to engage one or the other of the valves and move it away from its seat against the action of said resilient means accordingly as said operating member is moved in one direction or the other.

7. In combination a main valve and fluid pressure operating means therefor, including a chamber into which a fluid under pressure is admitted and from which it is exhausted to open and close said valve, and a thermostatic actuated mechanism controlling the admission to and exhaust from said chamber, said mechanism including separate inlet and outlet valve members resilient means tending to separate said members and cause them to seat, and a valve operating member on which said valves are slidingly mounted, said inlet valve member having stuffing box provisions for preventing leakage along said rod, and said operating member having provisions adapted to engage one or the other of the valves and move it away from its seat against the action of said resilient means accordingly as said member is moved in one direction or the other.

8. In combination a main valve and fluid pressure operating means therefor, including a chamber into which a fluid under pressure is admitted, and from which it is exhausted to open and close said valve, and a thermostatically actuated mechanism controlling the admission to and exhaust from said chamber, said mechanism including separate inlet and outlet valve members, resilient means tending to separate said members and cause them to seat, and a valve operating member on which said valves are slidingly mounted, said valve members having stuffing box provisions for preventing leakage along said rod, and said operating member having provisions adapted to engage one or the other of the valves and move it away from its seat against the action of said resilient means accordingly as said member is moved in one direction or the other.

9. A thermostatic valve mechanism comprising in combination a main valve casing formed with inlet and outlet chambers and with a port connecting them and with an aperture opening from said inlet chamber in line with said port and with a flange surrounding said aperture, a pilot valve casing formed with a pressure chamber and with an aperture opening therefrom and with a flange surrounding said aperture, a flexible diaphragm clamped at its margin between the flanges of the main and pilot valve casings and separating said inlet chamber from said pressure chamber, a valve controlling said port and operated by said diaphragm and thermostatically actuated means for varying the pressure in said pressure chamber.

10. A thermostatic valve mechanism adapted to control the heating of a water heater and comprising in combination a casing part adapted to be attached to the wall of the heater, and having a tubular extension which then projects into said heater, a valve actuating member comprising one part located within said casing part and tubular extension with its inner end engaging the latter, and having its outer end in sliding engagement with said casing part and formed with a threaded socket, a second threaded part screwed into said socket, means normally concealed by said casing part for locking said member in said socket in any desired adjustment, a third part in threaded engagement with said second part, and means for limiting the extent to which the length of said valve actuating member may be adjusted by rotating said third part relative to said second part.

11. A thermostatic valve actuating member comprising an elongated body portion, a second part, means for locking the said second part and body portion together in adjusted relation, a third part in threaded engagement with said second part and means limiting the extent to which said actuating member may be elongated by the threaded adjustment of said third part relative to the said second part.

12. A thermostatic valve mechanism comprising in combination a part formed with a sleeve bearing for a valve actuating member and a valve actuating member comprising one part slidingly received in said sleeve bearing and formed with a socket, a second part entering said socket and adjustable therein, a locking device for securing said first and second parts together and normally covered by said sleeve bearing, and a third part in threaded engagement with and thereby adjustable with respect to said second part.

13. A thermostatic valve mechanism adapted to control the heating of the water heater comprising in combination a casing part adapted to be attached to the wall of the water heater and comprising a tubular portion which then projects into the heater and formed at the outer end of said tubular portion with a sleeve bearing, a valve actuating member comprising one part locked within said tubular extension with its inner end abutting against the latter and its outer end slidable in said sleeve bearing, and formed with a threaded socket in said outer end, a second externally threaded part screwed into said socket; a locking screw for locking said first and second parts together in any desired relative adjustment, said locking screw being normally inclosed by said sleeve bearing; said second part being formed with a threaded socket; and a third part having a threaded portion screwed into and extending through said second part, and means secured in the inner end of said third part and adapted to engage the inner end of said second part and thereby limit the extent to which said valve actuating member may be elongated by rotating said third part relative to said second part.

LUTHER D. LOVEKIN.

Witnesses:
ARNOLD KATZ,
D. STEWART.